July 17, 1962
C. E. BRANICK
3,044,609
TIRE BEAD SPACING AND SUPPORTING ELEMENT
Filed Oct. 4, 1961
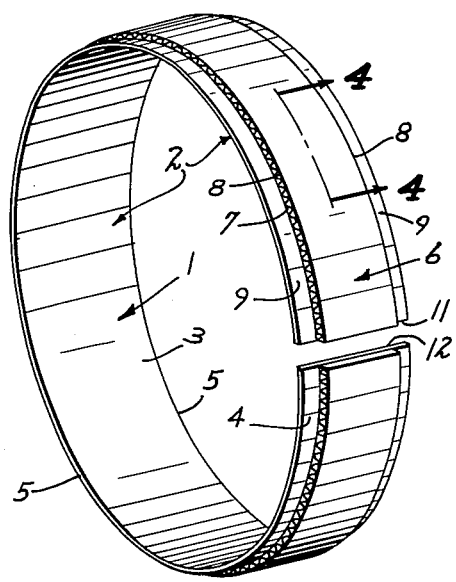
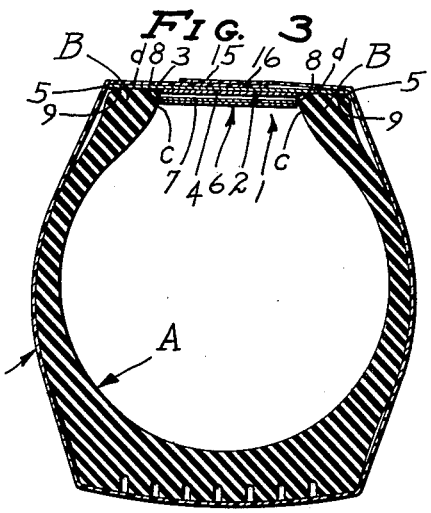
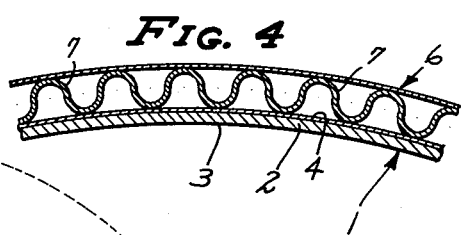
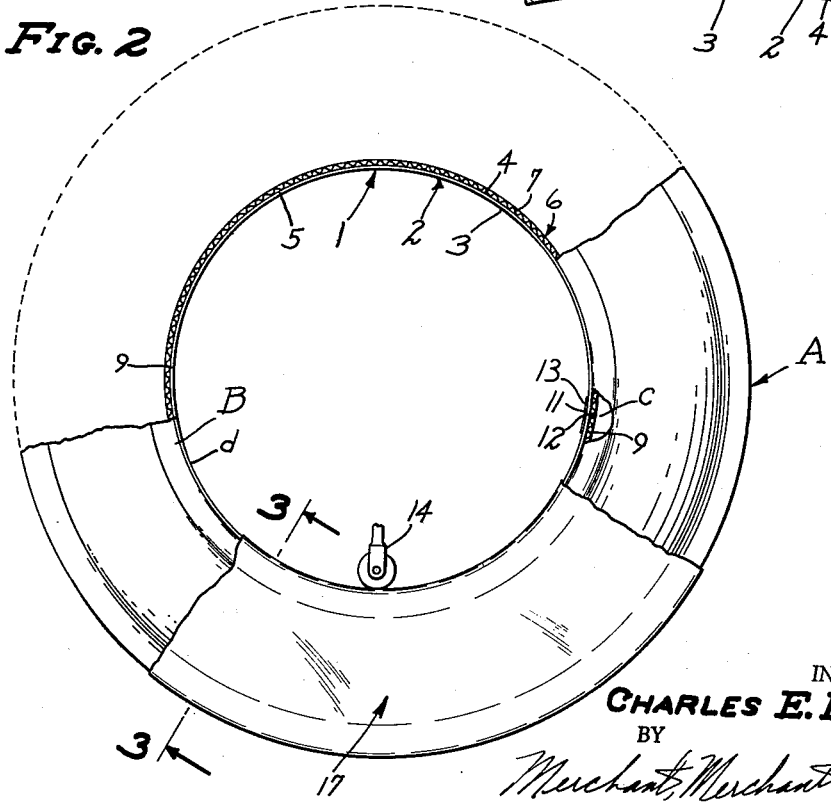
INVENTOR.
CHARLES E. BRANICK
BY
Merchant, Merchant & Gould
ATTORNEYS

# United States Patent Office 3,044,609
Patented July 17, 1962

3,044,609
TIRE BEAD SPACING AND SUPPORTING ELEMENT
Charles E. Branick, %Branick Mfg. Co., Box 1937, Fargo, N. Dak.
Filed Oct. 4, 1961, Ser. No. 142,810
2 Claims. (Cl. 206—46)

My invention relates generally to pneumatic tire handling and merchandising apparatus, and more particularly to a tire bead spacing and supporting element.

As indicated in my earlier Patent No. 2,972,405, a problem arises in the displaying of tires which have been stacked during storage and/or shipment because such stacking causes the flattening of the tire casing with a resulting distortion of the bead.

A primary object of my invention is the provision of an inexpensive and highly efficient spacer element for pneumatic tire casings which may be formed from paper stock and which may be applied with a minimum of time and with a minimum of effort, and when so applied will maintain a tire casing in its desired cross sectionally round condition.

A further object of my invention is the provision of a device of the class described which may be shipped or stored in flat or rolled form, as desired, and which is extremely light in weight, and compact.

A further object of my invention is the provision of a spacer, the radially inner surface of which is smooth and cylindrical so as to provide a substantially unbroken work surface to facilitate heat sealing of the overlapped edges of a thermoplastic cover being applied to a tire in the manner broadly disclosed in my copending application Serial No. 9,525, filed February 18, 1960, and entitled "Method of and Apparatus for Forming Wrappers for Articles of Annular Shape."

The above and still further objects of my invention will become apparent from the following detailed specification, appended claims and attached drawings.

Referring to the drawings wherein like characters indicate like parts throughout the several views:

FIG. 1 is a view in perspective of my novel bead spacer;

FIG. 2 is a view in side elevation of my novel spacer in operative position on a pneumatic tire casing, some parts being broken away;

FIG. 3 is an enlarged view in section taken on the line 3—3 of FIG. 2; and

FIG. 4 is a detail sectional view taken on the line 4—4 of FIG. 1.

Referring with greater particularity to the drawings, a conventional tire casing is identified by the letter A, the beads thereof by the letter B, the opposed axially inner surfaces of the beads B by the letter $c$, and the radially inner substantially cylindrical surfaces of said beads by the letter $d$.

My novel bead spacing and supporting element is sleeve-like in shape and is identified in its entirety by the numeral 1. The sleeve 1 includes a relatively wide radially inner member 2 preferably formed from flexible resilient paper stock, such as cardboard, having relatively smooth radially inner and outer surfaces 3, 4, respectively, the former of which provides a smooth unbroken work surface, for a purpose to be hereinafter explained.

Firmly adhered to the radially outer surface 4 of the member 2 intermediate the side edges 5 thereof is a circumferentially extended radially outwardly projecting central portion 6. Portion 6 is also preferably formed from suitable paper stock, such as corrugated board, the corrugations 7 of which, as shown particularly in FIG. 4, extend axially of the sleeve 1. In any event the opposite side edges of the radially outwardly projecting central portion 6 define endless radial shoulders 8 for engagement with the opposed axially inner surface $c$ of the bead B of the tire A, whereby to maintain said beads B in a desired spaced relationship. The outer peripheral surface of the member 2 outwardly from said shoulders 8 provide cylindrical seats 9 for reception of the radially inner surfaces of the beads B.

As above indicated, my novel bead spacer and supporting element may be shipped and stored in strip or roll form. In any event as a given tire A is about to be wrapped for storage or shipment the tire A is suitably supported on a suitable jig or support, not shown, and a strip of material is cut corresponding approximately to the opening 10 defined by the tire casing A. After the portion 6 has been inserted between the beads B, with the opposed radially inner surface $c$ thereof in engagement with the shoulders 8 and with the radially inner surface $d$ thereof in engagement with the seats 9, the adjacent ends 11, 12 of the sleeve 1 are secured together in operative relation by any suitable means, such as a strip of pressure sensitive adhesive 13. It will be noted that the radially inner face 3 of the sleeve portion 2 defines a smooth cylindrical work surface for the application of a heated sealing tool 14 which may be used to adhere the overlapping edges 15, 16 of a plastic tire casing 17 applied in accordance with the disclosure of the above-identified patent application.

My invention has been thoroughly tested and found to be completely satisfactory for the accomplishment of the above objects, and while I have shown a preferred embodiment thereof, I wish it to be understood that same may be capable of modification without departure from the scope and spirit of the appended claims.

What I claim is:

1. A tire bead spacing and supporting element comprising a flexible resilient annular sleeve formed on its external periphery to define a circumferentially extended radially outwardly projecting central portion, opposite side edges of said portion defining endless radial shoulders for engagement with the opposed axially inner surfaces of the beads of a pneumatic tire casing, the outer peripheral surface of said sleeve axially outwardly from said shoulders providing cylindrical seats for reception of the radially inner surfaces of said beads, the radially inner face of said sleeve defining a smooth cylindrical work surface.

2. The structure defined in claim 1 in which said sleeve comprises a radially inner member formed from flat paper stock and a radially outer central portion formed from corrugated paper board the corrugations of which extend axially of said sleeve.

References Cited in the file of this patent
UNITED STATES PATENTS

| | | |
|---|---|---|
| 2,400,930 | Herzegh | May 28, 1946 |
| 2,573,664 | Herzegh | Oct. 30, 1951 |